(12) United States Patent
Kalayjian (10) Patent No.: US 8,934,999 B2
(45) Date of Patent: Jan. 13, 2015

(54) ROBOTIC PROCESSING SYSTEM AND METHOD

(75) Inventor: Nicholas R. Kalayjian, San Carlos, CA (US)

(73) Assignee: Tesla Motors, Inc., Palo Alto, CA (US)

(*) Notice: Subject to any disclaimer, the term of this patent is extended or adjusted under 35 U.S.C. 154(b) by 466 days.

(21) Appl. No.: 13/372,472

(22) Filed: Feb. 13, 2012

(65) Prior Publication Data

US 2013/0211579 A1    Aug. 15, 2013

(51) Int. Cl.
G06F 19/00    (2011.01)
B23K 1/002    (2006.01)
B23K 31/00    (2006.01)
B23K 31/02    (2006.01)

(52) U.S. Cl.
USPC ........... 700/160; 700/186; 700/192; 700/193; 700/212; 700/245; 219/616; 228/180.1

(58) Field of Classification Search
CPC ....................................................... B23K 1/002
USPC ................. 700/160, 186, 192–195, 212, 245, 700/258–259; 257/779; 219/616; 228/180.1
See application file for complete search history.

(56) References Cited

U.S. PATENT DOCUMENTS

| | | | | |
|---|---|---|---|---|
| 4,560,100 A | * | 12/1985 | Hall | 228/40 |
| 5,274,336 A | * | 12/1993 | Crook et al. | 324/690 |
| 5,422,440 A | | 6/1995 | Palma | |
| 5,469,064 A | * | 11/1995 | Kerschner et al. | 324/537 |
| 5,963,662 A | * | 10/1999 | Vachtsevanos et al. | 382/150 |
| 5,995,380 A | | 11/1999 | Maue et al. | |
| 6,168,065 B1 | * | 1/2001 | Willemen | 228/9 |
| 6,359,331 B1 | | 3/2002 | Rinehart et al. | |
| 6,954,681 B2 | * | 10/2005 | Fisher et al. | 700/259 |
| 7,206,667 B2 | * | 4/2007 | Kleinschmitt | 700/245 |
| 7,732,320 B2 | * | 6/2010 | Johnson et al. | 438/615 |
| 7,869,193 B2 | | 1/2011 | Nohara et al. | |
| 8,054,633 B2 | | 11/2011 | Suwa et al. | |
| 8,158,493 B2 | * | 4/2012 | Shah et al. | 438/463 |
| 8,383,939 B2 | | 2/2013 | Gotou | |
| 2001/0005815 A1 | * | 6/2001 | Rosenberg et al. | 702/95 |
| 2003/0031038 A1 | | 2/2003 | Shirakawa et al. | |
| 2004/0217092 A1 | * | 11/2004 | Demers et al. | 219/117.1 |
| 2006/0239050 A1 | | 10/2006 | Andersson et al. | |
| 2009/0321394 A1 | * | 12/2009 | Matsushita | 219/121.64 |
| 2011/0110640 A1 | * | 5/2011 | Goto et al. | 385/137 |
| 2012/0305283 A1 | | 12/2012 | Kalayjian et al. | |

* cited by examiner

*Primary Examiner* — Ramesh Patel
(74) *Attorney, Agent, or Firm* — J. Richard Soderberg (57) ABSTRACT

A robotic processing system includes a microprocessor-controlled workpiece processor having a mobile processing element to be positioned independently in three orthogonal dimensions with respect to each of a plurality of target locations on a workpiece, with each particular target location of the plurality of target locations including an element to be processed, the mobile processing element processing the element at each particular target location by first moving to an initial location that is offset from the particular target location in a single dimension and then second moving along the single dimension towards the element at the particular target location until a contact signal is detected; and a control, coupled to the workpiece and to the mobile processing element, communicating the contact signal to the workpiece processor when the processing element makes physical contact with the element at the particular target location.

28 Claims, 4 Drawing Sheets

ROBOTIC PROCESSING SYSTEM AND METHOD

BACKGROUND OF THE INVENTION

The present invention relates generally to control of robotic systems, and more particularly but not exclusively, to closed loop control for soldering systems.

For some arrangements and configurations of semiconductor devices disposed on printed circuit board assemblies, formed bus bars and the like, the use of soldered joints provide mechanical and electrical interconnection. One tool for making such solder joints is a selective wave soldering station. This tool includes a mobile solder pot controlled in three-dimensions to locate a standing solder wave at each solder joint location such that solder contact is made at the target joint location.

It is not uncommon to have relatively large arrays of devices, and in such a context the conventional selective wave soldering solution is not always able to easily control a vertical position of each solder joint within a sufficient level of precision to allow repeatable solder joints.

As an exemplary embodiment, a specific workpiece referred to herein as a formed bus bar is described. While the present invention is applicable to other workpieces, the particulars of the formed bus bar are useful in efficiently and clearly detailing problems addressed, and representative solutions enabled, by the present invention. Additional details of the formed bus bar may be found in U.S. patent application Ser. No. 13/149,532 filed 31 May 2011 entitled "POWER ELECTRONICS INTERCONNECTION FOR ELECTRIC MOTOR DRIVES" the contents of which are hereby expressly incorporated in its entirety by reference thereto for all purposes.

The formed bus bar of the incorporated patent application includes a relatively large array of insulated gate bipolar transistor (IGBT) devices interconnected to a three-layer bus bar. These bus bars may have height deviations that can cause solder joint locations to vary widely. Using a conventional selective wave soldering solution on such a formed bus bar is problematic as solder joint location is not tightly controlled in wave height.

What is needed is an apparatus and method for controlling fine positioning in a robotic electronic array processor, particularly vertical positioning for a selective wave soldering station.

BRIEF SUMMARY OF THE INVENTION

Disclosed is an apparatus, method, and computer-program product for controlling fine positioning in a robotic electronic array processor, particularly a selective wave soldering station. The present invention includes embodiments directed towards precisely controlling a vertical height of a mobile solder wave at a solder joint location. However, the present invention is applicable to other robotic processing systems in addition to solder systems in which precise vertical positioning is necessary or desirable.

A robotic processing system includes a microprocessor-controlled workpiece processor having a mobile processing element to be positioned independently in three orthogonal dimensions with respect to each of a plurality of target locations on a workpiece, with each particular target location of the plurality of target locations including an element to be processed, the mobile processing element processing the element at each particular target location by first moving to an initial location that is offset from the particular target location in a single dimension and then second moving along the single dimension towards the element at the particular target location until a contact signal is detected; and a control, coupled to the workpiece and to the mobile processing element, communicating the contact signal to the workpiece processor when the processing element makes physical contact with the element at the particular target location.

A robotic processing method, the method including (a) moving a mobile processing element to an initial location with respect to a particular target location of a workpiece including a plurality of target locations, each particular target location including an element to be processed wherein the initial location is offset from the target location in a single dimension; and thereafter (b) moving the mobile processing element along the single dimension towards the element at the particular target location until a contact signal is received at a controller coupled to the mobile processing element; and thereafter (c) communicating the contact signal to the controller when the mobile processing element makes physical contact with the element at the particular target location.

A computer program product includes a non-transitory computer readable medium carrying program instructions for operating a system when executed using a computing system, the executed program instructions executing a robotic processing method, the method having (a) moving a mobile processing element to an initial location with respect to a particular target location of a workpiece including a plurality of target locations, each particular target location including an element to be processed wherein the initial location is offset from the target location in a single dimension; and thereafter (b) moving the mobile processing element along the single dimension towards the element at the particular target location until a contact signal is received; and thereafter (c) stopping the movement of the mobile processing element in step (b) responsive to a generation of the contact signal when the mobile processing element makes physical contact with the element at the particular target location.

Features/benefits include an ability to precisely variably locate a mobile solder wave vertically allowing embodiments of the present invention to uniformly provide superior solder joints over conventional selective wave solder systems and the like. Any warpage in a foundation structure supporting the electronic devices to be soldered is compensated for automatically.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide an apparatus, method, and computer-program product for controlling fine positioning in a robotic electronic array processor, particularly a selective wave soldering station. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
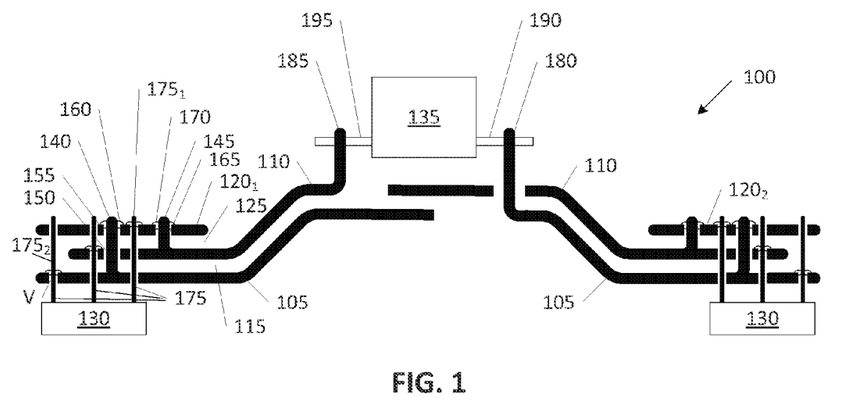
FIG. 1 illustrates a block schematic representation of an end-view of an exemplary bus bar implementation.

As noted above, an exemplary embodiment of the present invention processes a formed bus bar and the like. FIG. 1 illustrates a block schematic representation of an end-view of a formed bus bar 100. Bus bar 100 includes a plurality of bus bar layers, including a first bus bar layer 105 and a second bus bar layer 110. Interposed between each bus bar layer is an electrically insulating dielectric, for example, a dielectric layer 115. Bus bar 100 illustrates two bus bar layers, with other implementations including a different number of layers. Each bus bar layer (e.g., first bus bar layer 105 and second bus bar layer 110) is made from a formed bus bar material (e.g., copper, aluminum, or the like). Dielectric layer 115 includes a film of polyester, Kapton, and the like that provides an insulating laminate layer appropriate for the voltage and current carried by the bus bar layers. For example, each bus bar layer is about 0.5 mm thick having a separation of about 0.05 mm, though a wide range of thicknesses are possible. Components are physically mounted to, and electrically intercoupled by, the foundation structure to provide the desired bus bar 100. Variations in thicknesses of these layers, as well as warpage, will provide varying vertical locations where a solder joint is to be applied.

Bus bar 100 includes one or more printed circuit board assemblies (PCBA) 120. PCBA 120 is physically coupled to the bus bar layers and preferably is separated from the bus bar layers by a dielectric layer 125. The bus bar layers, the dielectric layers, and the PCBAs are provided with various vias and connection tabs for power and signal interconnections and for permitting electrical leads of the various components and devices to pass therethrough (and at certain points the leads and connection tabs are electrically fused to the bus bar layers and/or the PCBAs).

For example, a plurality of transistors, circuits, and components, herein referred to collectively as device(s) 130 are integrated into each PCBA 120, and a large power component 135 (for example a DC-Link or snubber capacitor or the like) is interconnected to form representative bus bar 100. A first bus bar connection tab 140 is made from a portion of first bus bar layer 105 and a second bus bar connection tab 145 is made from a portion of second bus bar layer 110.

A first via 150 is provided in second bus bar layer 110 and a second via 155 is provided in PCBA 120$_1$ permitting connection tab 140 to extend from first bus bar layer 105 into and through PBCA 120$_1$ and the intermediate bus bar and dielectric layers (note vias in the dielectric layers are not expressly called out in the figures). Connection tab 140 is then electrically fused (e.g., solder joint, ultrasonic weld, press fit or the like to make a low-resistance, high mechanical strength electrical contact) to PCBA 120$_1$. Similarly, a third via 165 is provided in PCBA 120$_1$ permitting second connection tab 145 to extend from second bus bar layer 110 into a through PCBA 120$_1$. By use of the connection tabs, voltages and/or currents from the bus bar layers are provided to the PCBAs. For example, first connection tab 140 may provide a first reference voltage available from first bus bar layer 105 to PCBA 120$_1$ and second connection tab 145 may provide a second reference voltage available from second bus bar layer 110 to PCBA 120$_1$.

Similarly, leads 175 from device 130 extend into and through various ones of the bus bar layers and PCBAs using aligned vias and selective electrical fusings to connect each lead as desired to the bus bar layers and/or the circuit(s) and component(s) of the PCBAs. For example, lead 175$_1$ is fused to PCBA 120$_1$ while lead 175$_2$ is fused to first bus bar layer 105, for example.

Bus bar 100 not only provides electrical coupling of components and devices, such as with device 130, but also mechanical mounting for PCBA 120. For relatively small and low mass devices like gate drive circuits, mechanical mounting requirements are not particularly stringent. device 130 may be mounted under first bus bar layer 105 (with any necessary or dielectric layer therebetween) and leads extending upwards and through the various layers. Conventional mounting techniques are able to adequately address securely mounting the devices to resist the operational vibrations and mechanical shocks that occur during operation of the EV. Which means that there is variability in placement of devices, and consequently variability in lead placement, with potentially varying lead length extension and vertical position location.

Figure 2:
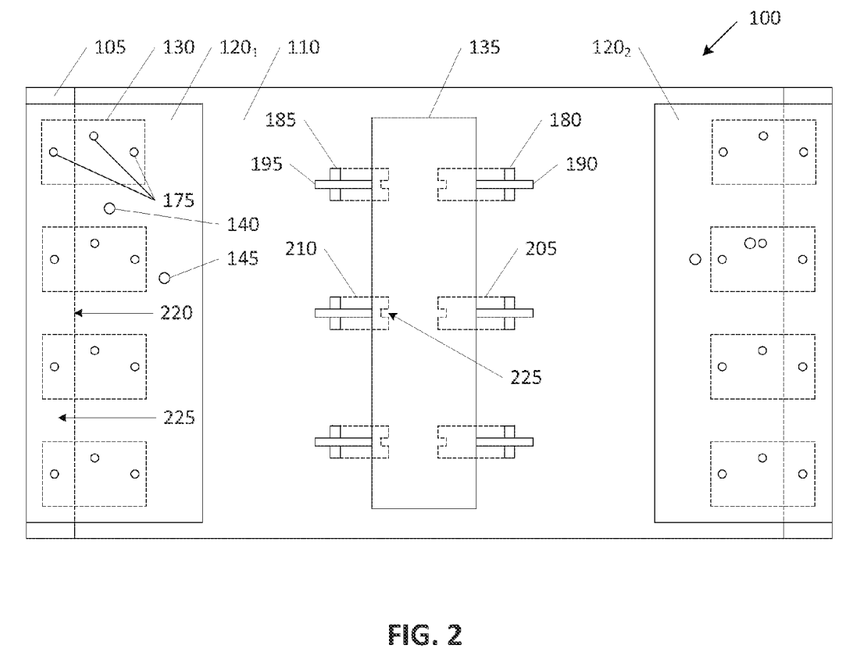
FIG. 2 illustrates a block schematic representation of a top view of the bus bar of FIG. 1.

FIG. 2 illustrates a block schematic representation of a top view of the bus bar 100 of FIG. 1. As better visualized in FIG. 2, a representative bus bar 100 includes four devices 130 (or other number of devices) on each side of component 135, with component 135 including three first polarity connection studs 190 physically mounted to three mounting tabs 180 and three second polarity connection studs 195 physically mounted to three mounting tabs 185.

As an aid in automating assembly and electric fusing (e.g., use of automatic soldering machines) of leads 175 of devices 130, the bus bar layers are tiered. In other words, an edge 220 of second bus bar layer 110 is not fully overlying first bus bar layer 105 which exposes a portion 225 of first bus bar layer 105. Before PCBAs 120 are mounted, it is easier for a solder machine to access a via V (and lead 175$_2$) extending through first bus bar layer to electrically fuse lead 175$_2$ to first bus bar layer 105 by providing this tiering. Allowing for electrical leads 175$_2$ that are to be electrically fused to first bus bar layer 105 to be routed through portion 225 simplifies the assembly of bus bar 100. In the case of more than two bus bar layers, each layer may be similarly tiered and leads to be fused for any given layer are fused in each exposed portion.

As noted above, electric fusing (e.g., soldering) is selectively performed between leads, connection tabs, and various layers and PCBAs. Because of the thickness of an assembled multilayer bus bar 100 and other variables as noted herein, it is difficult to make use of conventional soldering equipment when fusing a lead or connection tab to a bus bar layer and/or a PCBA. Embodiments of the present invention address these difficulties.

Figure 3:
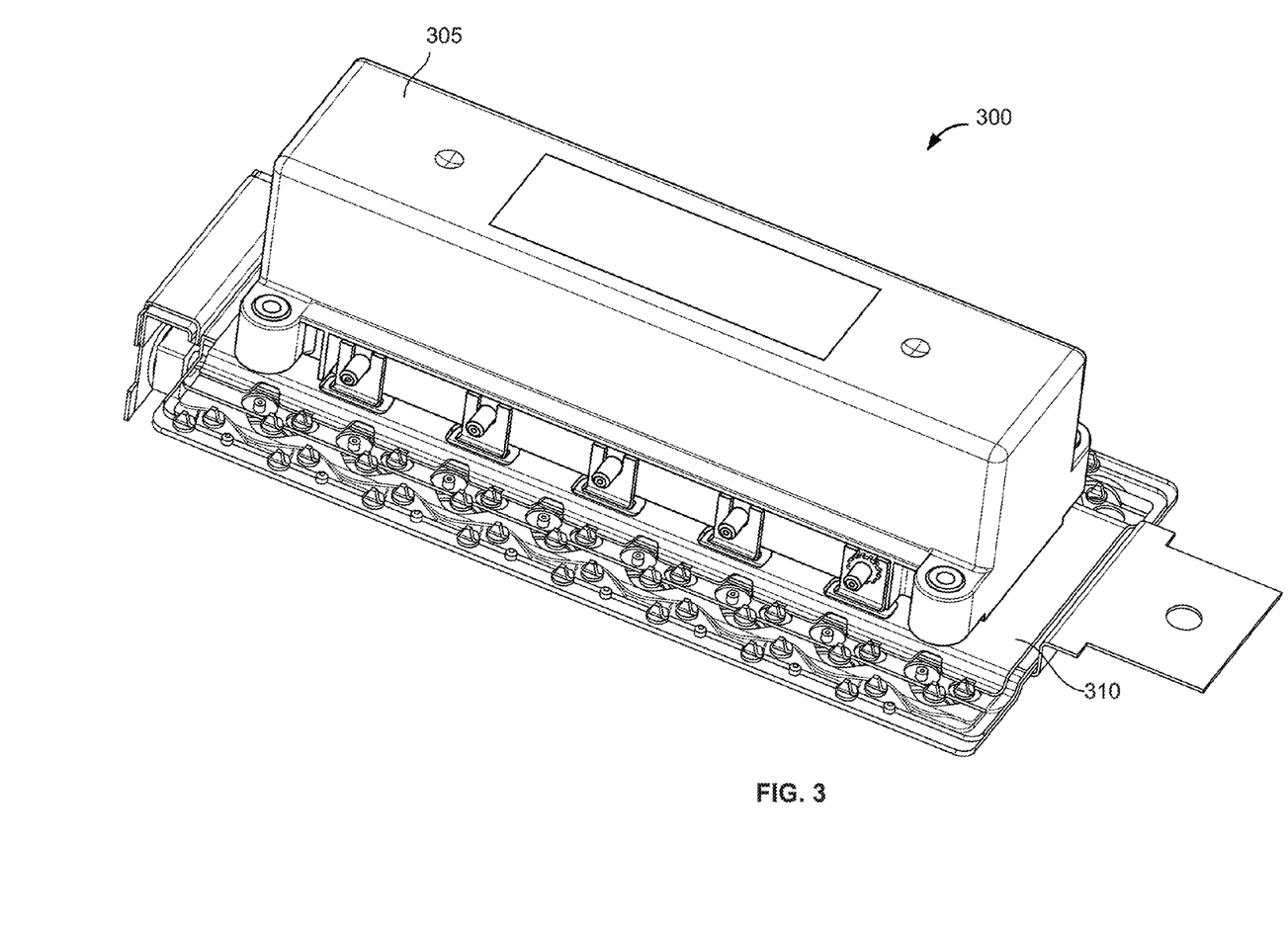
FIG. 3 illustrates a representative assembled bus bar.

FIG. 3 illustrates an assembled three-layer bus bar 300. Bus bar 300 includes a DC-Link capacitor 305 coupled to a multilayer tiered bus bar structure 310. Structure 310 supports a plurality of switching power transistors and intercouples them as well as drive electronics on one or more PCBAs (not shown in FIG. 3) to provide an inverter for one phase of a three-phase electric propulsion motor for an electric vehicle.

Figure 4:
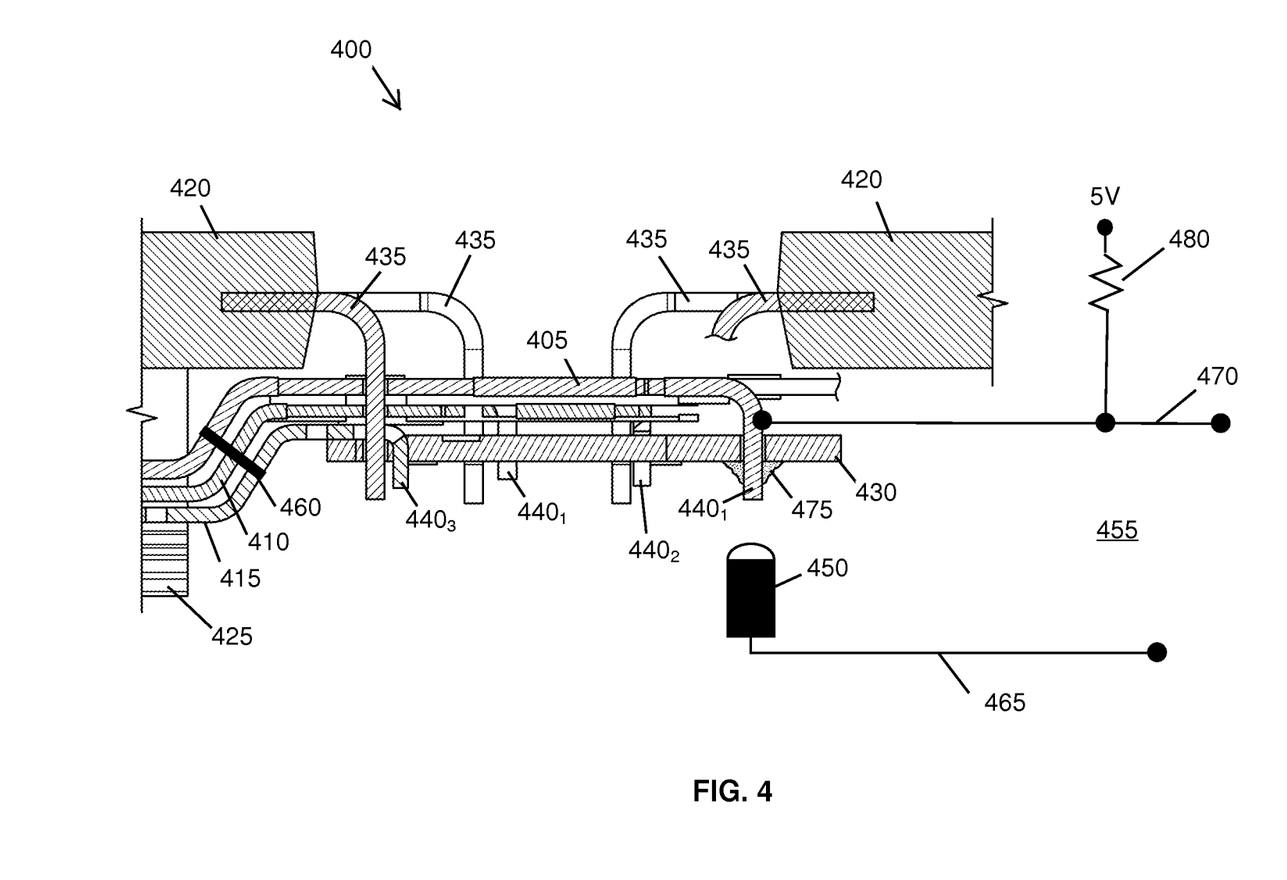
FIG. 4 illustrates a detailed view of a bus bar, such as shown in FIG. 1, including a printed circuit board and semiconductor devices electrically communicated to the bus bar.

FIG. 4 illustrates a detailed view of a bus bar portion 400 of an assembled tiered three conductive layer bus bar, a variant of bus bar 100 such as shown in FIG. 1. Bus bar portion 400 includes three laminated insulated bus bar layers (a first bus bar layer 405, a second bus bar layer 410, and a third bus bar layer 415) interconnecting a plurality of devices 420 (e.g., IGBT, MOSFET, semiconductor power devices, and the like) and a DC-Link capacitor 425 to each other as well as to a PCBA 430. A plurality of leads 435 of devices 420 are variously coupled to and electrically fused with the bus bar layers and/or PCBA 430. Each bus bar layer includes a bus bar connection tab 440 (e.g., a first connection tab $440_1$ for first bus bar layer 405, a second connection tab $440_2$ for second bus bar layer 410, a third connection tab $440_3$ for third bus bar layer 415) that connects the respective bus bar layer to PCBA 430. As illustrated, a vertical position/extension of leads and tabs from PCBA 430 varies, and this is without any detailing of layer thickness variation and layer warpage which contributes to further variations in vertical position location/lead extension.

Also illustrated in FIG. 4 is a nozzle 450 of a selective wave solder machine further illustrated in FIG. 5 and described below, and a vertical positioning feedback system 455. Feedback system 455 of a preferred implementation includes provision of an electrical short 460, a ground connection 465 to nozzle 450, and a control signal input 470. Electrical short 460 shorts together first bus bar layer 405, second bus bar layer 410, and third bus bar layer 415 so that leads/connectors/tabs coupled to any of these layers may be automatically detected by feedback system 455 for provision of an appropriate solder connection, e.g., a solder joint 475. A preferred implementation for feedback system 455 is a physical contact detector provided by a pull-up resistor 480 coupled to a 5V source for interaction with ground connection 465 through nozzle 450, though other feedback systems are implemented in other embodiments of the present invention.

The selective wave solder machine moves nozzle 450 to the proper location in a horizontal plane below PCBA 430 at the location of a target joint. The selective wave solder machine moves nozzle 450 vertically until contact is made (e.g., a current flows through pull-up resistor 480 to ground through the solder and ground connection 465). Once contact is made, any additional vertical delta distance is made for the desired solder joint requirements, such as by further vertical movement of nozzle 450 a controlled distance after contact to encompass the entire joint in solder. This contact detection compensates for variation/warpage and provides for precise engagement of solder wave from nozzle 450 with the workpiece.

In some embodiments, there is a fourth control variable available. The solder wave from nozzle 450 has a variable height above nozzle 450 that may be controlled by controlling a solder pump speed. Within a range, dependent upon each machine and configuration, the faster the solder pump speed, the higher the solder wave is above nozzle 450. Varying pump speed, and therefore solder wave height, may be used to compensate for variations, such as bus bar locations, warpage, lead length variations and the like. This adjustment may be in lieu of, or in addition to, the additional vertical delta distance mentioned above, with different implementations tuning these control parameters appropriately.

Figure 5:
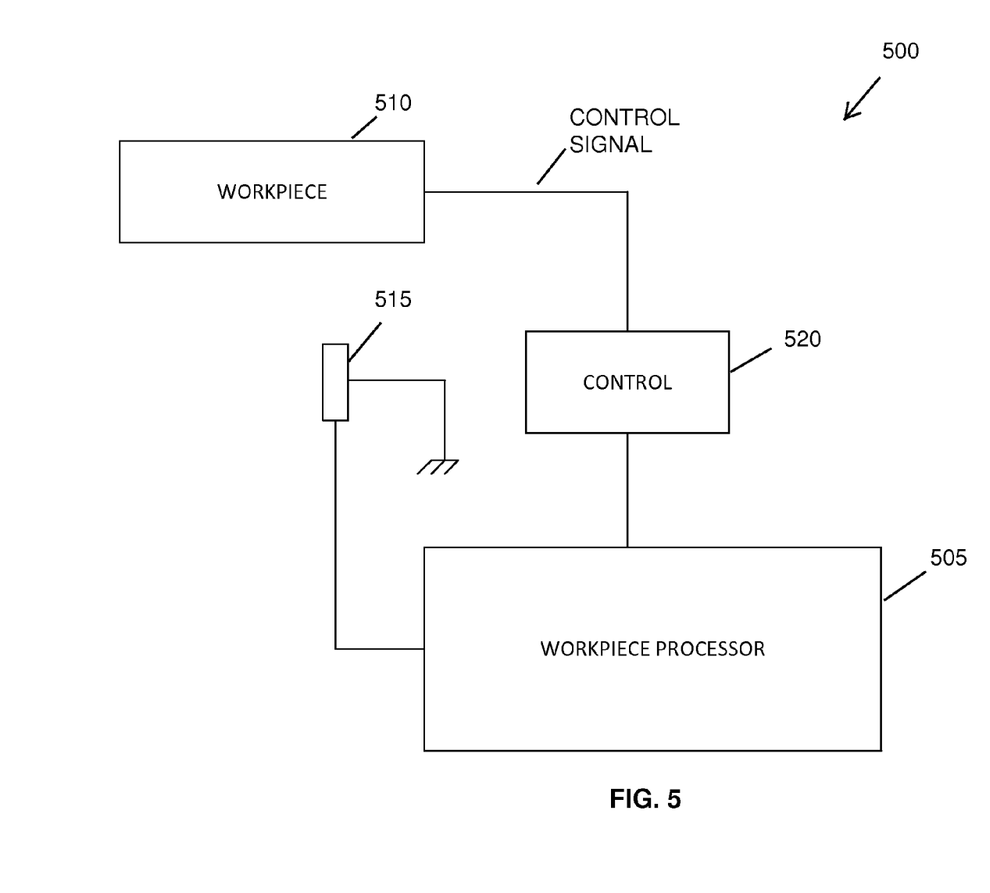
FIG. 5 illustrates a workpiece processing system including a workpiece processor that provides a mechanical interaction with a workpiece via a processing element according to a feedback control.

FIG. 5 illustrates a workpiece processing system 500 including a workpiece processor 505 that provides a mechanical interaction with a workpiece 510 via a mobile processing element 515 according to a feedback control 520. Workpiece processing system 500 is a generic description of the system detailed in connection with FIG. 4. Workpiece processor 505 includes selective wave soldering stations and other robotic processing stations that physically contact and operate on workpiece 510 via mobile processing element 515.

Workpiece 510 includes complex electrical systems, for example multi-layer bus bars that electrically interconnect an array of active devices that have elements (e.g., leads/tabs/connectors) to be processed (e.g., application of precise solder joints) with respect to a support foundation (e.g., a PCBA or other substrate or support or the like) with vertical location and extension that varies between elements of workpiece 510 and between corresponding elements across multiple workpieces 510. One feature that sets a preferred workpiece 510 apart from other workpieces is that, despite the possibility of including many devices, including active semiconductor devices, each having two or more elements to be interconnected, a few number of (e.g., 2-4) nodes are required to interconnect all the elements. A common scheme is thus able to be applied to the entire system by operation on these nodes. In the case of the bus bar portion 400 shown in FIG. 4, three nodes are all that is required to electrically couple to every element to be soldered. The structure of bus bar portion 400 is such that electrical short 460 temporarily connects all three nodes during processing, which enables all the elements to be processed at one time in the same fashion. Some systems may process each node, or a sub-combination of nodes, independently from others. In some embodiments, an optional fixture may be used to hold workpiece 510 in position, and electrical short 460 may be implemented by the fixture. In FIG. 4, a 5V source is used in cooperation with pull-up resistor 480, which may also be provided by the fixture, if used.

Mobile processing element 515 includes a device such as nozzle 450 or other remotely-controlled tool that may be first positioned in a plane relative to workpiece 510 (e.g., positioned beneath a target joint location in an x-y horizontal plane) and then which moves in an orthogonal third dimension towards workpiece 510 (e.g., vertically upwards along a z-axis). Workpiece processor 505 moves mobile processing element 515 independently in x-y-z directions as informed by control 520.

Control 520 may be implemented in many different ways and preferably includes contact feedback systems, more preferably physical contact feedback systems, but other contact and proximity feedback systems may be used. Workpiece processor 505 first positions mobile processing element 515 in the initial plane and then moves it in the orthogonal direction until control 520 detects the requisite contact. Workpiece processor 505 may then further adjust mobile processing element 515 an additional amount based upon the nature of the detected contact relative to the desired placement of mobile processing element 515 for intended function. For example, physical contact with an end of a lead may be detected and workpiece processor 505 may then move mobile processing element 515 an additional distance to form a proper solder joint.

As noted in the discussion of FIG. 4, control 520 may be implemented as a simple voltage level resulting from a voltage produced due to current flow through pull-up resistor 480. This current flows when a closed electrical circuit is formed that extends from the 5V voltage source through pull-up resistor 480 and one of the shorted nodes (e.g., one of the three shorted bus bar layers) and the particular element at the target location to mobile processing element 515 (e.g., nozzle 450) to ground through ground connection 465. That current flow establishes a feedback voltage (e.g., control signal) for control 520. Current flow can be detected as soon as nozzle 450 contacts an end of the element, but it may be that nozzle 450 needs to be moved higher to appropriately process the element. This additional distance is added into the processing instructions implemented by workpiece processor 505 as necessary or desirable.

The systems and methods are preferably implemented using a microprocessor executing program instructions from a memory, the instructions causing the apparatus to perform as described herein. The system and methods above has been described in general terms as an aid to understanding details of preferred embodiments of the present invention. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

The system, method, and computer program product described in this application may, of course, be embodied in hardware; e.g., within or coupled to a Central Processing Unit ("CPU"), microprocessor, microcontroller, System on Chip ("SOC"), or any other programmable device. Additionally, the system, method, and computer program product, may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, nanoprocessing, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, and computer program product embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

One of the preferred implementations of the present invention is as a routine in an operating system made up of programming steps or instructions resident in a memory of a computing system as well known, during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, and the like. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any non-transitory medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A robotic processing system, comprising:
    a microprocessor-controlled workpiece processor including a mobile processing element to be positioned independently in three orthogonal dimensions with respect to each of a plurality of target locations on a workpiece, with each particular target location of said plurality of target locations including an element to be processed, said mobile processing element processing said element at each particular target location by first moving to an initial location that is offset from said particular target location in a single dimension and then second moving along said single dimension towards said element at said particular target location until a contact signal is detected; and
    a controller, coupled to said workpiece and to said mobile processing element, communicating said contact signal to said workpiece processor when said processing element makes a physical contact with said element at said particular target location.

2. The robotic processing system of claim 1 wherein said contact signal is generated by a current flowing through said workpiece including said element to be processed and said mobile processing element.

3. The robotic processing system of claim 2 wherein a first element at a first particular target location is coupled to a first node of said workpiece and wherein a second element at a second particular target location is coupled to a second node of said workpiece.

4. The robotic processing system of claim 3 wherein said nodes are temporarily electrically shorted during processing of said first element and said second element.

5. The robotic processing system of claim 3 wherein a third element at a third particular target location is coupled to a third node of said workpiece and wherein said nodes are temporarily electrically shorted during processing of said first element, said second element, and said third element.

6. The robotic processing system of claim 5 wherein said workpiece includes a plurality of active semiconductor devices, wherein each said active semiconductor device includes three active connections with each active connection corresponding to an element at a particular target location, a first active connection coupled to said first node, a second active connection coupled to said second node, and a third active connection coupled to said third node.

7. The robotic processing system of claim 6 wherein said workpiece processor includes a selective wave solder station, wherein said mobile processing element includes a wave solder nozzle, and wherein said plane includes a horizontal plane disposed beneath said workpiece and said third dimension includes a vertical axis.

8. The robotic processing system of claim 1 wherein said controller advances said mobile processing element a predetermined distance along said single dimension towards said element after said physical contact.

9. The robotic processing system of claim 1 wherein said workpiece processor includes a selective wave solder station, wherein said mobile processing element includes a wave solder nozzle, and wherein said plane includes a horizontal plane disposed beneath said workpiece and said third dimension includes a vertical axis.

10. The robotic processing system of claim 9 wherein said controller advances said wave solder nozzle a predetermined distance along said single dimension towards said element after said physical contact.

11. The robotic processing system of claim 9 wherein said selective wave solder station includes a solder pump generating a solder wave for said solder wave nozzle wherein said solder pump is responsive to a pump speed control signal to control a height of said solder wave above said solder wave nozzle and wherein said controller advances said wave solder height a first predetermined distance towards said element after said physical contact.

12. The robotic processing system of claim 11 wherein said controller advances said wave solder nozzle a second predetermined distance along said vertical axis towards said element after said physical contact.

13. A robotic processing method, the method comprising the steps of:
    (a) moving a mobile processing element to an initial location with respect to a particular target location of a workpiece including a plurality of target locations, each particular target location including an element to be processed wherein said initial location is offset from said target location in a single dimension; and thereafter (b) moving said mobile processing element along said single dimension towards said element at said particular target location; and thereafter (c) communicating a contact signal to a controller when said mobile processing element makes a physical contact with said element at said particular target location, wherein said mobile processing element is moved until said contact signal is received at said controller.

14. The robotic processing method of claim 13 wherein said contact signal is generated by a current flowing through said workpiece including said element to be processed and said mobile processing element.

15. The robotic processing method of claim 14 wherein a first element at a first particular target location is coupled to a first node of said workpiece and wherein a second element at a second particular target location is coupled to a second node of said workpiece.

16. The robotic processing method of claim 15 wherein said nodes are temporarily electrically shorted during processing of said first element and said second element.

17. The robotic processing method of claim 15 wherein a third element at a third particular target location is coupled to a third node of said workpiece and wherein said nodes are temporarily electrically shorted during processing of said first element, said second element, and said third element.

18. The robotic processing method of claim 17 wherein said workpiece includes a plurality of active semiconductor devices, wherein each said active semiconductor device includes three active connections each active connection corresponding to an element at a particular target location, a first active connection coupled to said first node, a second active connection coupled to said second node, and a third active connection coupled to said third node.

19. The robotic processing method of claim 18 wherein said workpiece processor includes a selective wave solder station, wherein said mobile processing element includes a wave solder nozzle, and wherein said plane includes a horizontal plane disposed beneath said workpiece and said third dimension includes a vertical axis.

20. The robotic processing method of claim 13 further comprising the step of: d) advancing said mobile processing element a predetermined distance along said single dimension towards said element after said physical contact.

21. The robotic processing method of claim 13 wherein said workpiece processor includes a selective wave solder station, wherein said mobile processing element includes a wave solder nozzle, and wherein said plane includes a horizontal plane disposed beneath said workpiece and said third dimension includes a vertical axis.

22. The robotic processing method of claim 21 further comprising the step of: d) advancing said mobile processing element a predetermined distance along said single dimension towards said element after said physical contact.

23. The robotic processing method of claim 21 wherein said selective wave solder station includes a solder pump generating a solder wave for said solder wave nozzle wherein said solder pump is responsive to a pump speed control signal to control a height of said solder wave above said solder wave nozzle and further comprising: d) advancing said height of said wave solder a first predetermined distance along said single dimension towards said element after said physical contact.

24. The robotic processing method of claim 23 further comprising the step of: e) advancing said mobile processing element a second predetermined distance along said single dimension towards said element after said physical contact.

25. A computer program product comprising a non-transitory tangible computer readable medium carrying program instructions for operating a system when executed using a computing system, the executed program instructions executing a robotic processing method, the method comprising:

(a) moving a mobile processing element to an initial location with respect to a particular target location of a workpiece including a plurality of target locations, each particular target location including an element to be processed wherein said initial location is offset from said target location in a single dimension; and thereafter (b) moving said mobile processing element along said single dimension towards said element at said particular target location until a contact signal is received; and thereafter (c) stopping said movement of said mobile processing element in step (b) responsive to a generation of said contact signal when said mobile processing element makes physical contact with said element at said particular target location.

26. The computer program product of claim 25 wherein said contact signal is generated by a current flowing through said workpiece including said element to be processed and said mobile processing element.

27. The computer program product of claim 26 wherein a first element at a first particular target location is coupled to a first node of said workpiece and wherein a second element at a second particular target location is coupled to a second node of said workpiece.

28. The computer program product of claim 27 wherein said nodes are temporarily electrically shorted during processing of said first element and said second element.

* * * * *